(12) United States Patent
Muthuswamy et al.

(10) Patent No.: US 11,436,287 B2
(45) Date of Patent: Sep. 6, 2022

(54) COMPUTERIZED GROUPING OF NEWS ARTICLES BY ACTIVITY AND ASSOCIATED PHASE OF FOCUS

(71) Applicant: International Business Machines Corporation, Armonk, NY (US)

(72) Inventors: Srinivasan S. Muthuswamy, Bangalore (IN); Ratul Sarkar, Bangalore (IN); Ankit Kumar Singh, Ranchi (IN); Subhendu Das, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 17/114,419

(22) Filed: Dec. 7, 2020

(65) Prior Publication Data

US 2022/0179916 A1 Jun. 9, 2022

(51) Int. Cl.
  *G06F 16/93* (2019.01)
  *G06N 20/00* (2019.01)
(52) U.S. Cl.
  CPC ............. *G06F 16/93* (2019.01); *G06N 20/00* (2019.01)
(58) Field of Classification Search
  CPC ...... G06F 16/355; G06F 16/358; G06F 16/93; G06F 16/25; G06F 16/26; G06F 16/35; G06N 20/00
  See application file for complete search history.

(56) References Cited

U.S. PATENT DOCUMENTS

| | | | |
|---|---|---|---|
| 7,568,148 B1 | 7/2009 | Bharat | |
| 9,678,618 B1 | 6/2017 | Schrock | |
| 2013/0157234 A1* | 6/2013 | Gulli | G09B 19/00 434/154 |

FOREIGN PATENT DOCUMENTS

| | | |
|---|---|---|
| CN | 101174273 B | 6/2010 |
| CN | 103984681 B | 1/2017 |
| CN | 107423337 A | 12/2017 |
| CN | 104915446 B | 1/2019 |
| CN | 109325524 A | 2/2019 |
| CN | 106599181 B | 6/2019 |

(Continued)

OTHER PUBLICATIONS

Story Forest: Extracting Events and Telling Stories from Breaking News written by Bang Liu (hereafter Liu), ACM Transactions on Knowledge Discovery from Data, vol. 14, No. 3, Article 31. Publication date: May 2020. (Year: 2020).*

(Continued)

*Primary Examiner* — Hau H Hoang
(74) *Attorney, Agent, or Firm* — Michael A. Petrocelli

(57) ABSTRACT

A computer categorizes a news article by an activity and an associated activity phase, includes receiving, by a computer, at least one news article from an article source. The computer assigns for each news article, an activity of focus selected from a list of target activities, using a first machine learning model. The computer identifies, for each news article, at least one activity phase candidate selected from a list of activity phases associated with the activity of focus, using a second machine learning model. The computer determines, for each of new article, an activity phase of focus from among the activity phase candidates. The determination is based, at least in part on a confirmation attribute associated with the article. The computer categorizes each of the articles by said activity of focus and said activity phase of focus.

20 Claims, 8 Drawing Sheets

(56) References Cited

FOREIGN PATENT DOCUMENTS

| | | |
|---|---|---|
| CN | 110297988 B | 5/2020 |
| CN | 111125520 A | 5/2020 |
| WO | 2019056692 A1 | 3/2019 |

OTHER PUBLICATIONS

Mell et al., "The NIST Definition of Cloud Computing", National Institute of Standards and Technology, Special Publication 800-145, Sep. 2011, 7 pages.

* cited by examiner

| Importance Rank | Article # | Activity of Focus | Phase of Focus |
|---|---|---|---|
| 1 | 1 | Activity 1 | Phase 1 |
| 2 | 7 | Activity 1 | Phase 7 |
| 3 | 3 | Activity 1 | Phase 3 |
| 4 | 2 | Activity 1 | Phase 2 |
| 5 | 5 | Activity 1 | Phase 5 |
| 6 | 6 | Activity 1 | Phase 6 |
| 7 | 4 | Activity 1 | Phase 4 |

COMPUTERIZED GROUPING OF NEWS ARTICLES BY ACTIVITY AND ASSOCIATED PHASE OF FOCUS

BACKGROUND

The present invention relates generally to the field of using Artificial Intelligence (AI) to assess the content of unstructured documents, and more specifically, to using machine learning models to group news articles.

Machine Learning ("ML") is an aspect of Artificial Intelligence in which computers are used to make predictions about input data after being trained to identify relationships in diagnostic training data. A common ML task is the categorization of text, where patterns in training data text samples are identified and used to create analysis models that categorize input data text according to the identified patterns.

Unfortunately, some input data text exhibits attributes that can make categorization difficult. For example, it can be difficult to properly categorize input data text with content related to several distinct, yet related concepts.

SUMMARY

According to one embodiment, a computer-implemented method to categorize a news article by an activity and an associated activity phase, includes receiving, by a computer, at least one news article from an article source. The computer assigns for each news article, an activity of focus selected from a list of target activities, using a first machine learning model. The computer identifies, for each news article, at least one activity phase candidate selected from a list of activity phases associated with the activity of focus, using a second machine learning model. The computer determines, for each news article, an activity phase of focus from among the activity phase candidates. The determination is based, at least in part on a confirmation attribute associated with the article. The computer categorizes each of the articles by activity of focus and the associated activity phase of focus. According to aspects of the invention, the article is characterized by at least one activity-indicating feature and at least one activity-phase-indicating feature, and at least one of the selections is made, at least in part, in accordance with the respective features. According to aspects of the invention, the confirmation attribute is a Term Frequency—Inverse Document Frequency (TFIDF) value for the activity-phase-indicating feature within the news article; and an activity-phase-indicating feature having a highest overall TFIDF value among all of activity-phase-indicating features is determined to be the activity phase of focus. According to aspects of the invention, the confirmation element includes time-related metadata. According to aspects of the invention, the computer receives a state diagram indicating a phase occurrence sequence for the activity phases associated with the activity of focus, the time-related metadata indicates a position associated with said article relative to the phase occurrence sequence; and the activity phase of focus determination is based, at least on part, on the position. According to aspects of the invention, there is a group of news articles, and the articles are ranked according to an importance value associated with the activity of focus and associated activity phase of focus. According to aspects of the invention, at least one article has a group of activity phase candidates and the activity phase of focus determination is made based, at least in part, on the confirmation attribute.

According to another embodiment, a system to categorize a news article by an activity and an associated activity phase, which comprises: a computer system comprising a computer readable storage medium having program instructions embodied therewith, the program instructions executable by a computer to cause the computer to: receive at least one news article from an article source; assign, for each of said news articles, an activity of focus selected from a list of target activities, using a first machine learning model; identify, for each of said news articles, at least one activity phase candidate selected from a list of activity phases associated with said activity of focus, using a second machine learning model; determine, for each of said news articles, an activity phase of focus from among said at least one activity phase candidates, said determination being based, at least in part on a confirmation attribute associated with said article; and categorize each of said articles by said activity of focus and said activity phase of focus.

According to another embodiment, a computer program product to categorize a news article by an activity and an associated activity phase, the computer program product comprising a computer readable storage medium having program instructions embodied therewith, the program instructions executable by a computer to cause the computer to: receive, using a computer, at least one news article from an article source; assign, using the computer, for each of said news articles, an activity of focus selected from a list of target activities, using a first machine learning model; identify, using said computer, for each of said news articles, at least one activity phase candidate selected from a list of activity phases associated with said activity of focus, using a second machine learning model; determine, using said computer, for each of said news articles, an activity phase of focus from among said at least one activity phase candidates, said determination being based, at least in part on a confirmation attribute associated with said article; and categorize, using said computer, each of said articles by said activity of focus and said activity phase of focus.

The present disclosure recognizes the shortcomings and problems associated with relying solely on semantic equivalence to group news articles by activity and related phase.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
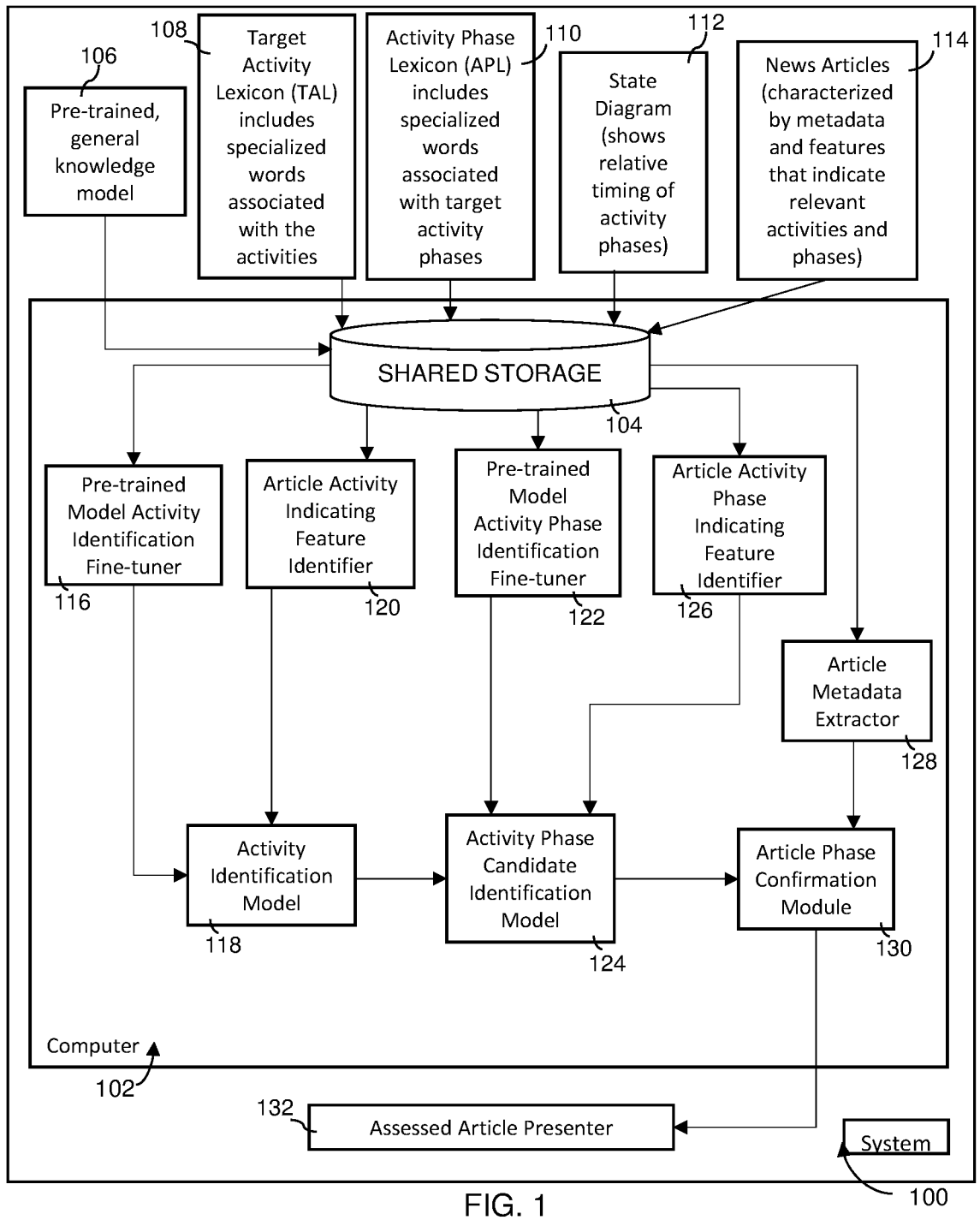
FIG. 1 is a schematic block diagram illustrating an overview of a system for computer-implemented use of machine learning models and metadata assessment to categorize news articles by activity and activity phase according to embodiments of the present invention.
Figure 2:
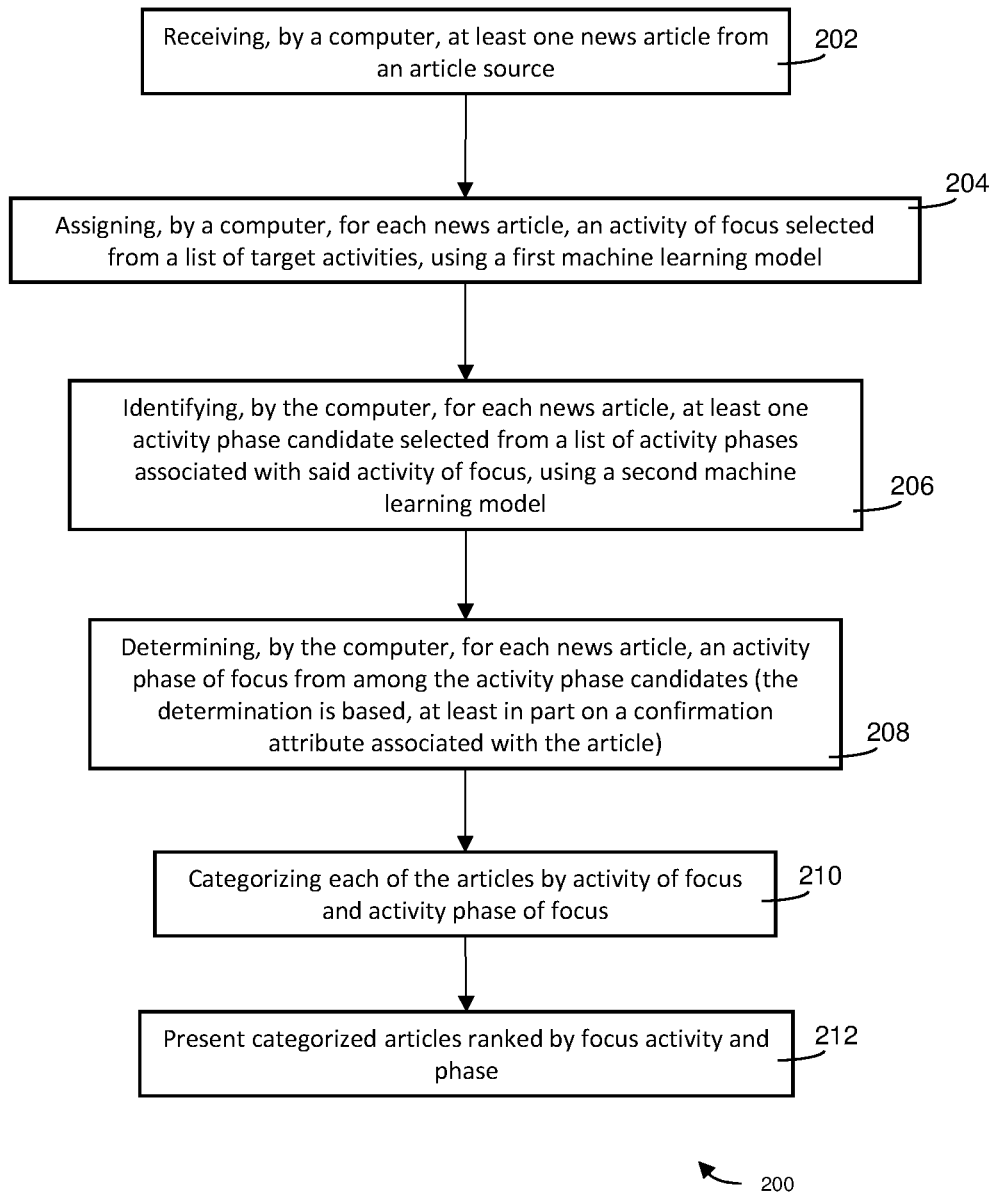
FIG. 2 is a flowchart illustrating a method, implemented using the system shown in FIG. 1, of using a combination of machine learning models and metadata assessment to categorize news articles by activity and activity phase according to aspects of the invention.
Figures 5, 6:
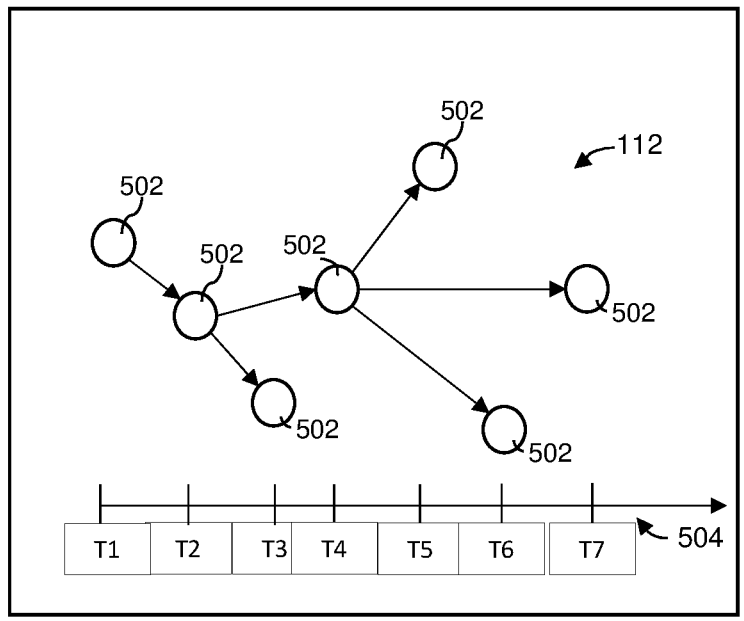
FIG. 5 is a state diagram schematically representing a phase occurrence sequence for activity phases associated with an activity of focus according to aspects of the invention.
FIG. 6 is a table showing state diagram schematically representing a phase occurrence sequence for activity phases associated with an activity of focus according to aspects of the invention.

Now with combined reference to the Figures generally and with particular reference to FIG. 1 and FIG. 2, an overview of a method 200 to categorize news articles by activity and an associated activity phase usable within a system 100 as carried out by a server computer 102 having optionally shared storage 104 is shown. The server computer 102 receives a pre-trained, general knowledge model 106 from a model source. The model is preferable a broad-topic model (e.g., such as a model based on Google news embeddings, BERT, or some other model suitable for fine-tuned transfer-learning), although models with domain-specific information may be suited if specifically chosen according to the judgment of one skilled in this field. The server computer 102 receives a Target Activity Lexicon (TAL) 108 that includes domain-specific, specialized words associated with target activities 109 that are of interest to the user. According to aspects of the invention, the target activities 109 include multi-phase events, such as a series of sporting events that may collectively contribute to an overall title (e.g., grand slam events in tennis; athlete progress during a decathlon event, various racing series, etc.). Other relevant activities 109 include long-range travel covered in a series of documentary entries. According to other aspects of the invention, the activities 109 could also include events associated with various legal phases (e.g., crime activities) that are discussed initially during an allegation phase and then discussed further during later investigation, trial, and resolution phases. According to aspects of the invention, the TAL 108 may be provided by a domain specialist and presents words that are beyond general knowledge and may not typically be associated with target activities 109 by audiences without domain-specific knowledge. According to aspects of invention, the server computer 102 uses the TAL 108 during fine-tuning of the general knowledge model to increase model prediction accuracy when presented with domain-specific embeddings for features related to the target activities 109. The server computer 102 receives an Activity Phase Lexicon (APL) 110 that includes domain-specific, specialized words associated with activity phases 111 of associated with the target activities 109. The server computer 102 uses the TAL 108 during fine-tuning of the general knowledge model 106 to increase model prediction accuracy when presented with domain-specific embeddings for features related to the phases 111 of the target activities 110. According to aspects of the invention, the APL 110 may be provided by a domain specialist and identifies words that are beyond general knowledge and may not typically be associated with target activities 109 by audiences without domain-specific knowledge. The server computer receives a state diagram 112 associated with the target activities that indicates an occurrence sequence for activity phases 111. According to aspects of the invention, the state diagram 112 that shows the relative timing of phases 111 which might occur over a period of time and which collectively tell an overall story related to a given occurrence of a target activity 109. According to aspects of the invention (e.g., as shown in FIG. 5), the state diagram 112 includes activity phase nodes 502 that correspond to activity phases 111 and a relative timeline 504 or similar guide that indicates how the various nodes are sequenced over time. The sever computer 102 receives one or more news articles 114 that, according to aspects of the invention may contribute to an overall story or may otherwise be part of a collection of interrelated news articles 114 that each address one or more of the phases 111 associated with the target activities 109. With additional reference to FIG. 5, it is noted that news articles, particularly those that occur mid-way through a series of related phases 111, may discuss more than phase 111 of a given activity, as a way of given an overview of the activity, and associated placement of the nodes 502 along the timeline 504 helps confirm an article phase of focus 111 when several activity phases are discussed in a given news article. When categorizing the content of a news article, it can be difficult to select one phase of focus from among several candidate phases associated with a given activity using semantic analysis alone. According to aspects of the invention, state diagram 112 provides a confirmation attribute, to increase selection accuracy from among several interrelated phases 111 for a given target activity 109 by providing information not revealed by word association alone. The state diagram 112 provides information about how a given article 114 fits into the overall story of a given activity occurrence and may improve accuracy when a machine learning model is used to predict a correct phase of focus (e.g., by providing various time-based references to which article metadata may be compared). For example, the state diagram 112 may allow elimination of semantically-identified candidate phases that cannot have occurred, based on phase node 502 timing and an occurrence date of the article. Other time-based conclusions may be reached when in accordance with the judgment of those skilled in this field. It is also noted that while a generic state diagram 112 may suffice for all activities in a particular area of interest (e.g., simply identifying beginning, middle, and later stages), some target activities 109 may require a customized diagram. The server computer 102 includes a Pre-trained Model Activity Identification Fine-tuner (PMAIF) 116 that uses the TAL 108 to enhance the general knowledge model 106. In particular, the PMAIF 116 uses the specialized words in the TAL 108 as labelled training data to train the general knowledge model 106 to characterize words with embeddings (or other semantic feature vectors) similar to those of the specialized words as words to categorize as being associated with the target activity 109. According to aspects of the invention, this additional training results in an Activity Identification Model 118 that has enhanced accuracy for identifying target activities 109 not only by using the specialized words included in the APL but also by finding words semantically similar to that APL content. The server computer 102 includes Article Activity Indicating Feature Identifier (AAIFI) 120 that extracts features from provided news articles 114 for use in the indication relevant target activities for the articles. The server computer 102 includes a Pre-trained Model Activity Phase Identification Fine-tuner (PMAPIF) 122 that uses the APL 110 to enhance the general knowledge model 106. In particular, the PMAIF 116 uses the specialized words in the APL 110 as labelled training data to train the general knowledge model 106 to characterize words with embeddings (or other semantic feature vectors) similar to those of the specialized words as words to categorize as being associated with the phases 111 of the various target activities 109. According to aspects of the invention, this additional training results in an Activity Phase Candidate Identification Model 124 that has enhanced accuracy for identifying target activities 109 not only by using the specialized words included in the APL but also by finding words semantically similar to that APL content. The server computer 102 includes Article Activity Phase Indicating Feature Identifier (AAPIFI) 126 that extracts features from provided news articles 114 for use in indication of candidate activity phases 111 for the articles. The server computer 102 includes an Article Metadata Extractor (AME) 128 that identifies information from articles 114 that may be used by Article Phase Confirmation Module (APCM) 130 as confirmation attribute to help select from among several activity phase candidates identified by the APCIM 124. The server computer 102 presents, displays, stores, or otherwise makes available assessments of the categorized article 114 in an Assessed Article Presenter (AAP) 132. The AAP may provide mere categorization of articles 114 (e.g., grouped by target activity and activity phase) or ranked output (e.g., placed in hierarchy according to importance of the various or activities, according to a predetermined standard such as, for example, an indication of article activity and phase importance provided by a user or along with article metadata associated with the articles 114 and identified by the AME 128.

Now with reference specifically to FIG. 2, and to other figures generally, a method 200 to categorize news articles by activity and activity phase, using the system shown in FIG. 1, will now be described. The server computer 102 receives, at block 202, the TAL 108 and APL 110 from a user having domain-specific knowledge. The server computer also receives a pre-trained, general knowledge model 106 from a model source and a state diagram 112 indicating a phase occurrence sequence for the activity phases 111 associated with the target activities 109 from a diagram source (e.g., a user with domain specific knowledge). The server computer 102 also receives one or more articles 114 for categorization. According to aspects of the present invention, the articles 114 are characterized by discernable features that indicate relevant activities and related phases, such as articles that tell an overall story associated with a one or more entity and related incidences of multi-phased target activities.

Figure 3:
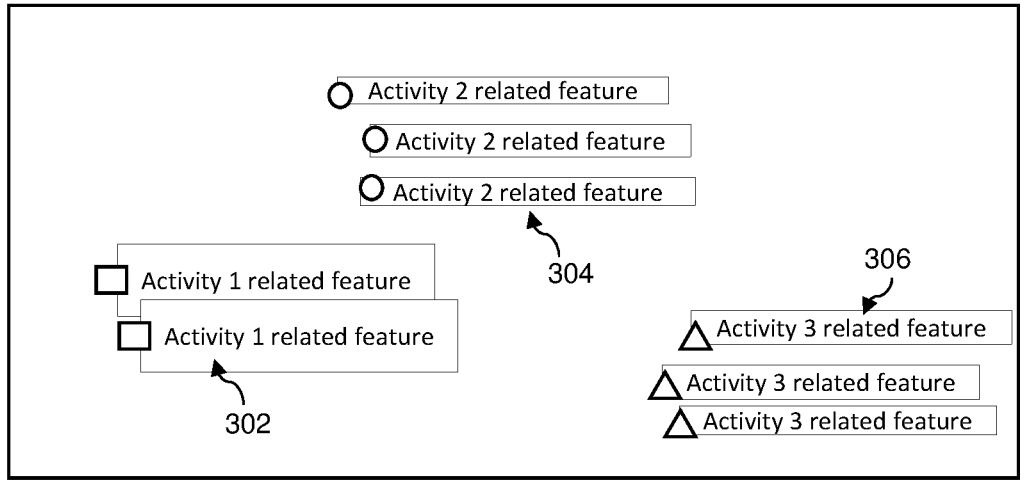
FIG. 3 is a schematic representation of word clusters that are associated with various activities of focus according to aspects of the invention.

The server computer 102 assigns, at block 204, for each news article 114, an activity of focus 606 (as seen schematically in FIG. 6) selected from a list of target activities (e.g., the activities identified in the TAL 108), using the Activity Identification Model 118. According to aspects of the invention, the AAIFI 120 will extract activity indicating features 302, 304, 306 (shown schematically in FIG. 3, where physical proximity indicates semantic similarity), such as words with embeddings similar to embeddings of words the AIM 118 has been trained to categorize as belonging to a target activity 109 provided to the system 100. The feature extraction may be done in a variety of manners in accordance with the judgment of one skilled in this field. A preferred feature extraction method considers the "term frequency-inverse document frequency" a value known to those skilled in this field as the TF-IDF value of the various tokens (e.g., words, or other n-grams selected in accordance with the judgment of one skilled in this field). In this known approach, the importance of various tokens within a given article 114 is determined, after the article 114 has undergone preprocessing to eliminate characters and tokens (such as punctuation characters and various stop words). Once the TF-IDF value is determined for tokens in a given article 114, the tokens with the highest value (e.g., top 10%, or other top-k quantity of tokens selected by one skilled in this field) are passed along for further processing in the AIM 118. Once received by the fine-tuned AIM 118, the server computer 102 identifies, using known machine learning processes, the target activity 109 indicated by the extracted features 302, 304, 306. Although several options could provide satisfactory results, the preferred target activity identification method is to compare the extracted activity indicating features 302, 304, 306 with the TAL 108 and look either for a direct token match or for an activity 109 characterized within the AIM 118 by a feature vector embedding having a cosine similarity that exceeds a threshold value (e.g., a value that indicates a 80% match) compared to activities identified in the TAL 108. If several target activities 109 are indicated, the AIM 118 assigns a highest value match. The target value identified by the AIM 118 is assigned as the activity of focus 606 for the article 114, and this assignment is passed along for further processing in block 204.

Figure 4:
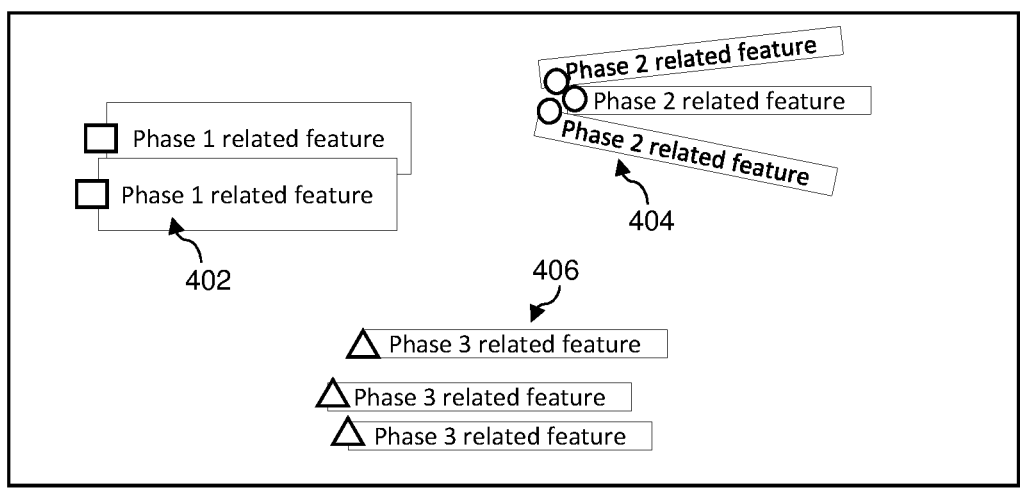
FIG. 4 is a schematic representation of word clusters that are associated with activity phases of an activity of focus according to aspects of the invention.

The server computer 102 identifies, at block 206, for each news article 114, at least one activity phase 111 candidate selected from a list of activity phases (e.g., the phases provided in the APL 110) with the activity of focus identified by the AIM 118, using the APCIM 124. According to aspects of the invention, the AAPIFI 126 will extract activity phase indicating features 402, 404, 406 (shown schematically in FIG. 4, where physical proximity indicates semantic similarity), such as words with embeddings similar to embeddings of words the APCIM 124 has been trained to categorize as belonging to an activity phase 111 provided to the system 100. The feature extraction may be done in a variety of manners in accordance with the judgment of one skilled in this field. A preferred feature extraction method considers the "term frequency-inverse document frequency" a value known to those skilled in this field as the TF-IDF value of the various tokens (e.g., words, or other n-grams selected in accordance with the judgment of one skilled in this field), in which the importance of various tokens within a given article 114 is determined, after the article 114 has undergone preprocessing to eliminate characters and tokens (such as punctuation characters and various stop words). Once the TF-IDF value is determined for tokens in a given article 114, the tokens with the highest value (e.g., top 10%, or other top-k quantity of tokens selected by one skilled in this field) are passed along for further processing in the APCIM 124. Once received by the fine-tuned APCIM 124, the server computer 102 identifies, using known machine learning processes, the activity phase candidates indicated by the extracted features 402, 404, 406. Although several options could provide satisfactory results, the preferred target activity identification method is to compare the extracted activity indicating features with the APL 110 and look either for a direct token match or for a phase 111 characterized within the APCIM 124 by a feature vector embedding having a cosine similarity that exceeds a threshold value (e.g., a value that indicates a 80% match) compared to activities identified in the TAL 108. It is noted that, in accordance with aspects of the invention, a given article discuss several aspects of a given activity, and may therefor indicate several activity phase candidates. Regardless of whether one or more activity phase candidates is identified, all candidates phases 111 are passed along for further processing in block 208.

The server computer 102, via cooperative action between the AME 128 and APCM 130, determines in block 208 for each news article, an activity phase of focus 608 (as seen schematically in FIG. 6) from among the activity phase candidates identified in the APCIM 124. In particular, the APCM 130 considers a confirmation attribute and determines which activity phase candidate is the most-likely phase of focus for the article 114 being assessed. In embodiment, the APCM 130 considers a state diagram 112 that indicates a phase occurrence sequence for the activity phases 111 associated with said activity of focus 606. The state diagram may, for example, indicate that (via a diagram phase nodes 502 assigned to a given position on a timeline 504) certain phases of the target activity occur in a certain order or at a certain pace. Metadata from the AME 128 can provide time-relevant information (e.g., a time of occurrence for the article 114 being analyzed) relevant to that indicates certain phases cannot have yet occurred at the time was written, thus eliminating certain activity phase candidates from consideration. The metadata may also include a date certain on which an expected event will occur, and the presence of that date certain as the time occurrence for the article being assessed may direct the APCIM) 124 to directly confirm the associated phase candidate as the phase of focus 608. It is noted that other diagnostic uses for the metadata and state diagram may be selected by one skilled in this field, without departing from the spirit of the aspects of the present invention. The metadata collected by the AME 128 may also be used to indicate a desired use of match value noise filtering, so that phase selections for features associated with dense feature vector embeddings (e.g., group 404) may be conducted with elevated filtering. In cases with only one identified phase candidate, the metadata may provide an absolute activation threshold (such as an TD-IDF value or other value indicating an embedding match value exceeding 95%) and a phases candidates exhibiting that threshold level are selected directly as the phase of focus 608. If multiple activity phase candidates are present, the threshold may be relative threshold, and a highest TF-IDF value among all phases exceeding the threshold may be selected.

The server computer 102 categorizes, at block 210, the articles 114 by assigned activity of focus 606 and associated phase of focus. It is noted that the articles 114 assessed may be assigned an article number 604 (shown schematically in FIG. 6), and those article numbers can be used in conjunction with an importance rank value 602 (shown schematically in FIG. 6) to show how which articles meet a predetermined standards established. For example, as shown in FIG. 6, articles labeled #1 and #7 are ranked first and second, because those articles show phases 1 and 7, showing how the activity of focus 606 originated (in Article #1, which correlates to the first phase of the activity deemed important to exemplary the user expecting the results in FIG. 6) and relevant final discussions are presented in Article #7, which corresponds to the last phase of the activity of focus (deemed important to exemplary the user expecting the results in FIG. 6). It is noted that other ranking is possible, and that article ranking is not a requirement. The server computer 102 presents, stores, or otherwise makes available, the categorized (and possibly ranked) article results in block 212.

Figure 7:
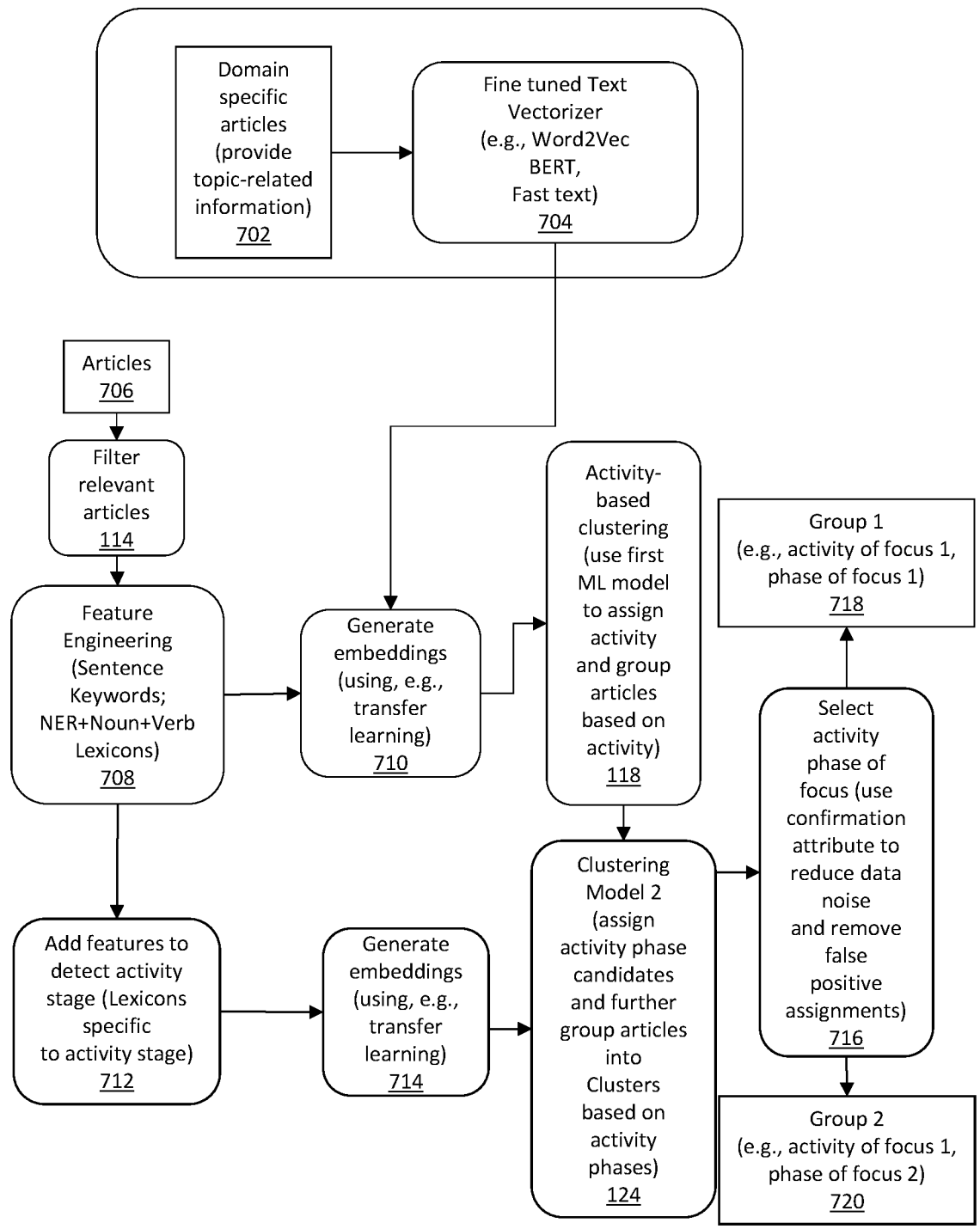
FIG. 7 is a schematic flow diagram showing aspects of an embodiment of a system that groups news articles by activity and activity phase according to aspects of the invention.

Now with reference to FIG. 7, a schematic flow diagram showing aspects of an embodiment of a system that groups news articles by activity and activity phase according to aspects of the invention will be described. The server computer 102 at block 702 receives domain specific articles that provide topic-related information to generate a fine-tuned vectorizer in block 704. Many suitable vectorizers exist, including BERT and other transformer-based models, the Natural Language Processing (NLP) method known as, "Word2Vec", and the text classification library for the Python environment, known as FastText", and these are chosen at the discretion of on having skill in this field. The server computer 102 at block 706 receives general topic news articles (these may be structured or unstructured), and using NLP or other topic recognition techniques known to those having skill in this field, the server computer filters the provided articles 114 relevant to preselected topics (and by extension, also by associated topic phases). The server computer 102 conducts, at block 708, feature engineering tasks on the filtered target-activity-based articles 114 (e.g., tasks including Named-Entity Recognitions (NER), noun recognition, verb identifications, and other lexicon generation tasks), to determine a Target Activity Lexicon (TAL) 108 associated with the list of target activities 109. At block 710, the server computer 102 combines output from the fine-tuned vectorizer and the engineered lexicon to generate enriched embeddings (e.g., trained to include vectors of semantically-similar, domain specific terms). The server computer 102 uses these enriched embeddings in the Activity Identification Model (AIM) 118 to generate high-accuracy activity of focus identifications. It is noted that if multiple filtered articles cover the same (or similar) topics, regardless of ultimate activity phase determination, the articles sharing the identified activity of focus may share an initial grouping. This may occur through transfer learning (in which pre-existing word vectorizers are fine-tuned, such as in aspects of the present invention), to enrich previously-known embeddings with domain-specific embeddings, thereby leveraging both deep coverage of general words and semantically-relevant links to specialized terms. In transfer learning, words that are semantically-similar to previously-identified relevant embeddings are added to the fine-tuned model (e.g., AIM 118), often as an additional hidden layer in the model. As a result, it is expected that articles with similar words (and now, according to aspects of the invention, even domain specific words) will cluster together, even if news the articles do not have exactly the same word content. The sever computer 102 conducts, at block 712, additional feature engineering tasks on the filtered target-activity-based articles 114 (e.g., tasks including Named-Entity Recognitions (NER), noun recognition, verb identifications, and other lexicon generation tasks), to determine an activity phase lexicon 110 associated with the list of activity phases 111. The server computer 102 uses these embeddings in the Activity Phase Candidate Identification Model 124 to identify activity phase candidates. Transfer learning may occur (in which pre-existing word vectorizers are fine-tuned, such as in aspects of the present invention), to enrich previously-known embeddings with domain-specific embeddings, thereby leveraging both deep coverage of general words and semantically-relevant links to specialized terms. In transfer learning, words that are semantically-similar to previously-identified relevant embeddings are added to the model (e.g., APCIM 124), typically as an additional hidden layer in the model. As a result, it is expected that similar words (including domain specific words) will cluster together, even if news the articles do not have exactly the same word content. It is noted that, for a variety of reasons, a given news article may discuss several phases of a particular activity of focus (e.g., several activity phase candidates). In these situations, it will be often be appropriate to down-select from a group of identified activity phase candidates and confirm a single phase of focus. The server computer 102 accomplishes this confirmation via the Article Phase Confirmation Module 130 at block 716, in which the server computer selects activity phase of focus (e.g., using a confirmation attribute to reduce data noise and remove false positive candidate phase assignments). The server computer 102 places articles, for example, into a first group (e.g., associated with activity of focus 1 and phase of focus 1) in block 718 and a second group (e.g., associated with activity of focus 1 and phase of focus 1) in block 720.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
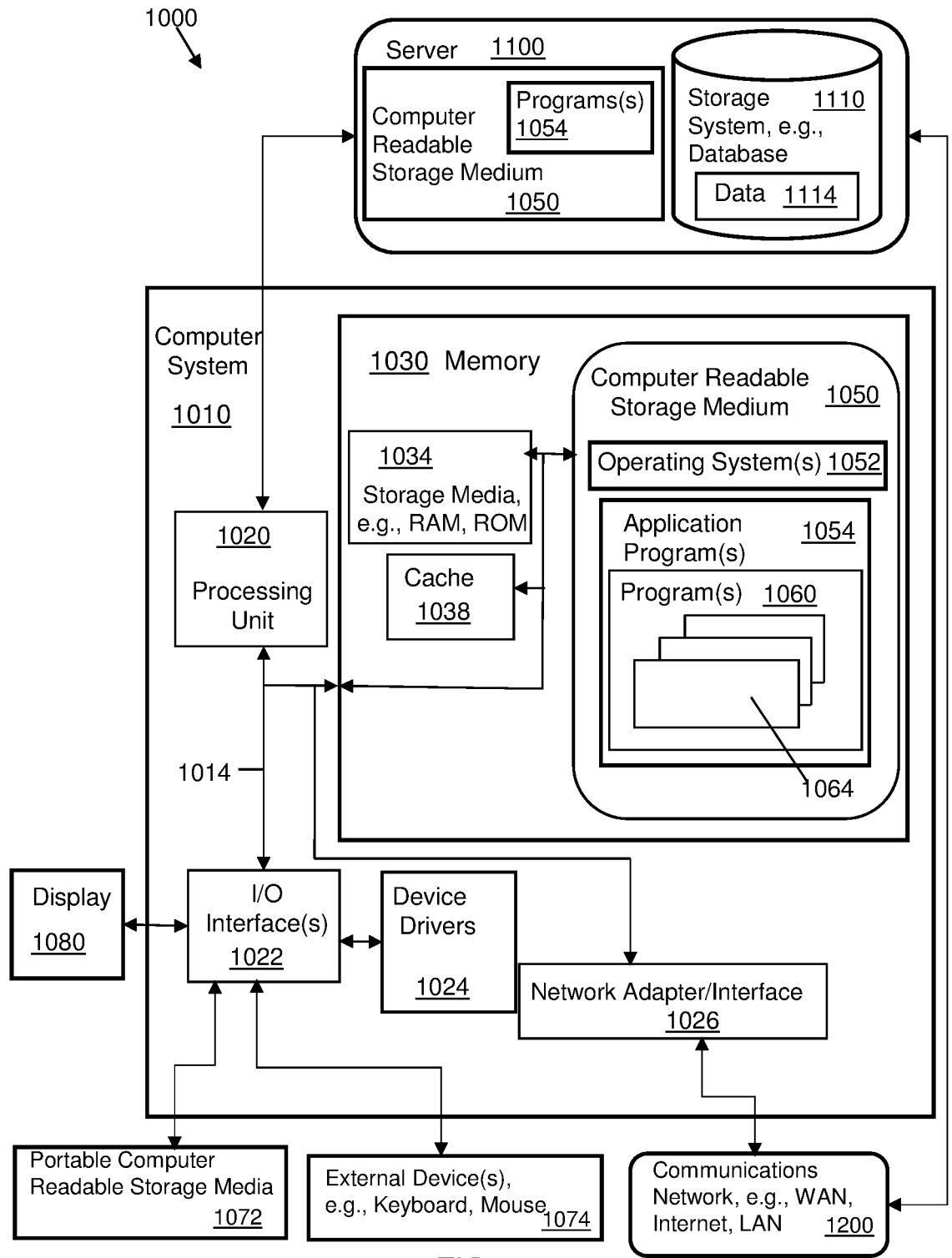
FIG. 8 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 8, a system or computer environment 1000 includes a computer diagram 1010 shown in the form of a generic computing device. The method 200, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
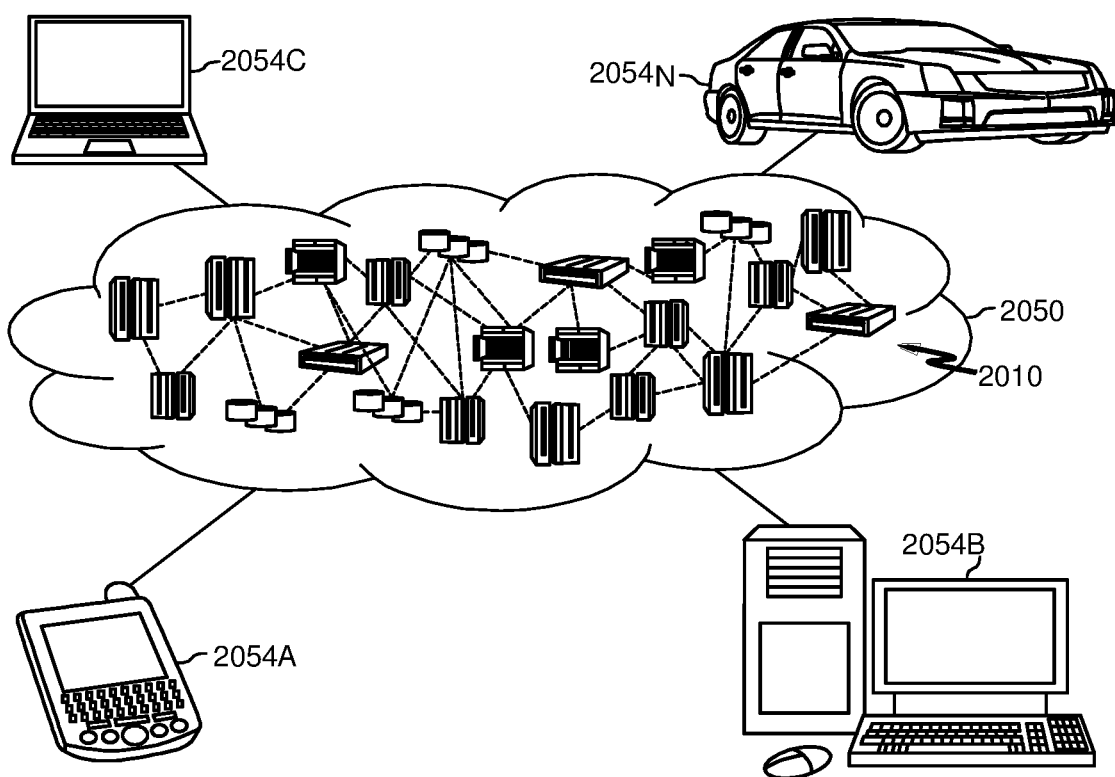
FIG. 9 depicts a cloud computing environment according to an embodiment of the present invention.

Referring now to FIG. 9, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 10:
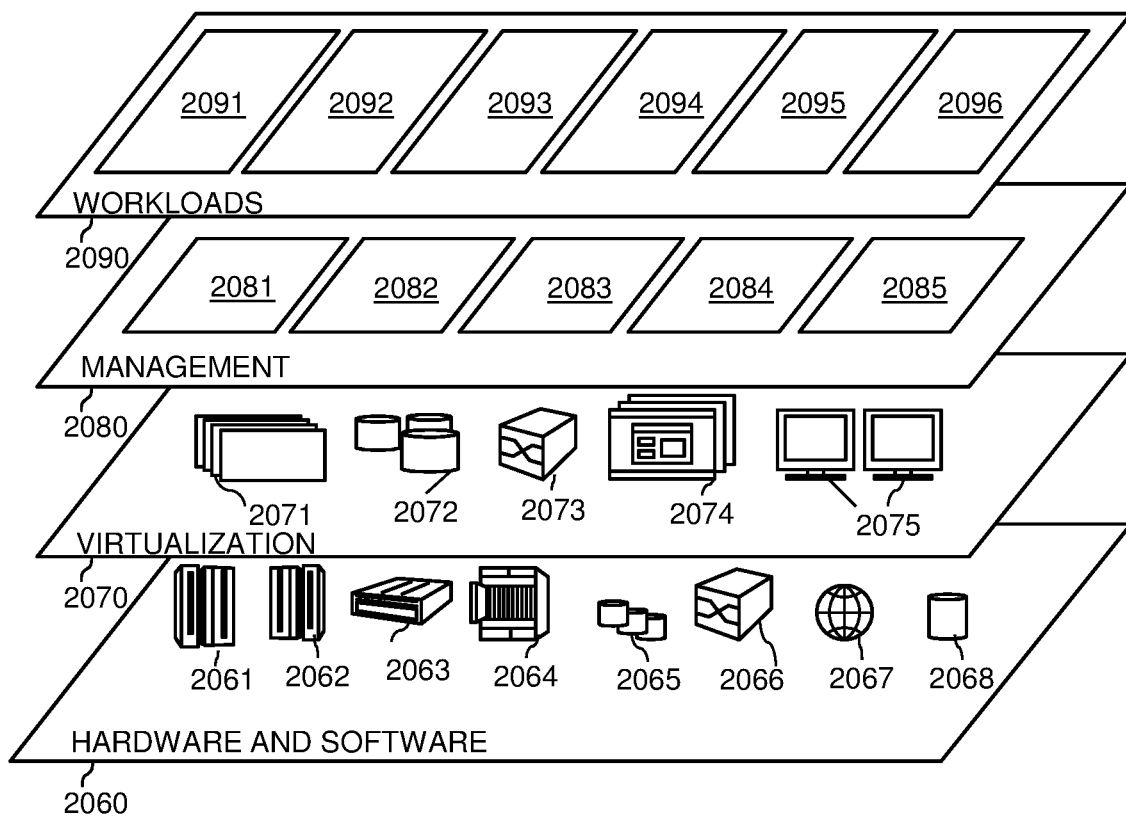
FIG. 10 depicts abstraction model layers according to an embodiment of the present invention.

Referring now to FIG. 10, a set of functional abstraction layers provided by cloud computing environment 2050 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized.

Examples of workloads and functions which may be provided from this layer include: mapping and navigation 2091; software development and lifecycle management 2092; virtual classroom education delivery 2093; data analytics processing 2094; transaction processing 2095; and categorizing news articles by activity and activity phase using a combination of machine learning models and metadata assessment 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method to categorize a news article by an activity and an associated activity phase, comprising:
    receiving, by a computer, at least one news article from an article source;
    assigning, by said computer, for each said at least one news article, an activity of focus selected from a list of target activities, using a first machine learning model;
    identifying, by said computer, for each said at least one news article, activity phase candidates selected from a list of activity phases associated with said activity of focus, using a second machine learning model;
    determining, by said computer, for each said at least one news article, activity phases of focus from among said activity phase candidates, said determination being based, at least in part on a confirmation attribute associated with said news article;
    generating a state diagram from several interrelated phases of the activity phase candidates, the state diagram including various time-based references to which article metadata can be compared, wherein the metadata is at least part of the confirmation attribute associate with the news article;
    eliminating semantically-identified candidate phases that cannot have occurred, based on phase node timing and an occurrence date of an article; and
    categorizing, by said computer, each said at least one news article by said activity of focus and said activity phase of focus.

2. The method of claim 1, wherein each said at least one news article is characterized by at least one activity-indicating feature and at least one activity-phase-indicating feature, and wherein a respective at least one of said selections is made, at least in part, in accordance with said respective features.

3. The method of claim 2, wherein said confirmation attribute is a Term Frequency—Inverse Document Frequency (TFIDF) value for said at least one activity-phase-indicating feature within said news article; and
    wherein an activity-phase-indicating feature having a highest overall TFIDF value among all of said activity-phase-indicating features is determined to be the activity phase of focus.

4. The method of claim 1, wherein said confirmation attribute includes time-related metadata.

5. The method of claim 4, further comprising:
    receiving a state diagram indicating a phase occurrence sequence for the activity phases associated with said activity of focus;
    wherein said time-related metadata indicates a position associated with said news article relative to said phase occurrence sequence; and
    wherein said activity phase of focus determination is based, at least on part, on said position.

6. The method of claim 1, wherein said at least one news articles is a plurality of news articles; and
    wherein each of said plurality of news articles is ranked within the plurality of news articles according to an importance value associated with said activity of focus and associated activity phase of focus.

7. The method of claim 1, wherein, for said at least one news article, said at least one activity phase candidate is a plurality of activity phase candidates, and wherein said activity phase of focus determination is made among the plurality of activity phase candidates based, at least in part, on said confirmation attribute.

8. A system to categorize a news article by an activity and an associated activity phase, which comprises:
    a computer system comprising a computer readable storage medium having program instructions embodied therewith, the program instructions executable by a computer to cause the computer to:
    receive at least one news article from an article source;
    assign, for each said at least one news article, an activity of focus selected from a list of target activities, using a first machine learning model;
    identify, for each said at least one news article, at least one activity phase candidate selected from a list of activity phases associated with said activity of focus, using a second machine learning model;
    determine, for each said at least one news article, an activity phase of focus from among said at least one activity phase candidates, said determination being based, at least in part on a confirmation attribute associated with said news article;
    generate a state diagram from several interrelated phases of the activity phase candidates, the state diagram including various time-based references to which article metadata can be compared, wherein the metadata is at least part of the confirmation attribute associate with the news article;
    eliminate semantically-identified candidate phases that cannot have occurred, based on phase node timing and an occurrence date of an article; and
    categorize each said at least one news article by said activity of focus and said activity phase of focus.

9. The system of claim 8, wherein each said at least one news article is characterized by at least one activity-indicating feature and at least one activity-phase-indicating feature, and wherein a respective at least one of said selections is made, at least in part, in accordance with said respective features.

10. The system of claim 9, wherein said confirmation attribute is a Term Frequency—Inverse Document Frequency (TFIDF) value for said at least one activity-phase-indicating feature within said news article; and wherein an activity-phase-indicating feature having a highest overall TFIDF value among all of said activity-phase-indicating features is determined to be the activity phase of focus.

11. The system of claim 8, wherein said confirmation element includes time-related metadata.

12. The system of claim 11, further comprising:
receiving a state diagram indicating a phase occurrence sequence for the activity phases associated with said activity of focus;
wherein said time-related metadata indicates a position associated with said news article relative to said phase occurrence sequence; and
wherein said activity phase of focus determination is based, at least on part, on said position.

13. The system of claim 8, wherein said at least one news article is a plurality of news articles; and
wherein each of said plurality of news articles is ranked within the plurality of news articles according to an importance value associated with said activity of focus and associated activity phase of focus.

14. The system of claim 8, wherein, for said at least one news article, said at least one activity phase candidate is a plurality of activity phase candidates, and wherein said activity phase of focus determination is made among the plurality of activity phase candidates based, at least in part, on said confirmation attribute.

15. A computer program product to categorize a news article by an activity and an associated activity phase, the computer program product comprising a computer readable storage medium having program instructions embodied therewith, the program instructions executable by a computer to cause the computer to:
receive, using a computer, at least one news article from an article source;
assign, using the computer, for each said at least one news article, an activity of focus selected from a list of target activities, using a first machine learning model;
identify, using said computer, for each said at least one news article, at least one activity phase candidate selected from a list of activity phases associated with said activity of focus, using a second machine learning model;
determine, using said computer, for each said at least one news article, an activity phase of focus from among said at least one activity phase candidates, said determination being based, at least in part on a confirmation attribute associated with said news article;
generate a state diagram from several interrelated phases of the activity phase candidates, the state diagram including various time-based references to which article metadata can be compared, wherein the metadata is at least part of the confirmation attribute associate with the news article;
eliminate semantically-identified candidate phases that cannot have occurred, based on phase node timing and an occurrence date of an article; and
categorize, using said computer, each of said news articles by said activity of focus and said activity phase of focus.

16. The computer program product of claim 15, wherein each said at least one news article is characterized by a Term Frequency—Inverse Document Frequency (TFIDF) value for said at least one activity-phase-indicating feature within said news article; and
wherein an activity-phase-indicating feature having a highest overall TFIDF value among all of said activity-phase-indicating features is determined to be the activity phase of focus.

17. The computer program product of claim 15, wherein said confirmation element includes time-related metadata.

18. The computer program product of claim 17, further comprising:
receiving a state diagram indicating a phase occurrence sequence for the activity phases associated with said activity of focus;
wherein said time-related metadata indicates a position associated with said at least one news article relative to said phase occurrence sequence; and
wherein said activity phase of focus determination is based, at least on part, on said position.

19. The computer program product of claim 15, wherein said at least one news article is a plurality of news articles; and
wherein each of said plurality of news articles is ranked within the plurality of news articles according to an importance value associated with said activity of focus and associated activity phase of focus.

20. The computer program product of claim 15, wherein, for each said at least one news article, said at least one activity phase candidate is a plurality of activity phase candidates, and wherein said activity phase of focus determination is made among the plurality of activity phase candidates based, at least in part, on said confirmation attribute.

* * * * *